Figure 1:
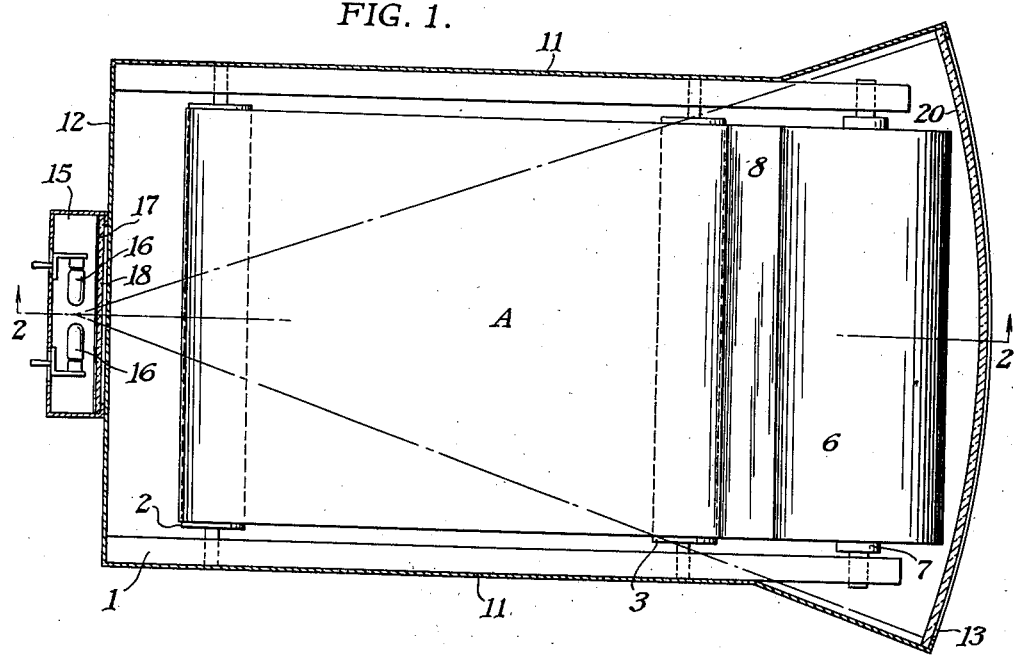

April 10, 1951   C. A. MORRISON   2,548,551
APPARATUS FOR INSPECTION OF SENSITIZED MATERIALS
Filed March 10, 1949

CHARLES A. MORRISON
INVENTOR
BY
ATTORNEYS

Patented Apr. 10, 1951

2,548,551

UNITED STATES PATENT OFFICE 2,548,551

APPARATUS FOR INSPECTION OF SENSITIZED MATERIALS

Charles A. Morrison, Rochester, N. Y., assignor to Eastman Kodak Company, Rochester, N. Y., a corporation of New Jersey Application March 10, 1949, Serial No. 80,687

3 Claims. (Cl. 88—14)

This invention relates to apparatus for inspection of light-sensitive photographic material for imperfections. One object of my invention is to provide an apparatus of the class described in which the illuminating system is so arranged that the object being inspected may be brilliantly illuminated and imperfections may have sufficient contrast to be readily visible. Another object of my invention is to provide inspection apparatus in which the illuminating system is such that the inspection can be accomplished without undue eyestrain on the part of the inspector. A further object of my invention is to provide a simple and efficient type of inspecting machine which can be readily operated by relatively unskilled help, and other objects will appear from the following specification; the novel features being particularly pointed out in the claims at the end thereof.

In inspecting light-sensitive photographic materials, such as film or paper, it is necessary to provide for sufficient illumination of the material to permit defects or imperfections to be viewed, but, on the other hand, it is desirable, of course, to keep the illumination even through suitable color filters at a minimum amount in order to overcome the ever-present possibility of fogging the light-sensitive coatings. Most methods of inspection have utilized light sources of large area and of diffusing characteristics, and therefore have lowered considerably the apparent contrast of surface defects. The high diffusion of the source has required large wattage and has also reduced the safelight factor. One of the primary objects of my invention is to provide as much illumination as possible with as low wattage as possible, and to obtain the maximum value of the light used for inspection purposes by utilizing most of the light from the source, and by preventing direct light rays from the source from striking the material to be inspected. The most critical condition for inspection of the defects of the surfaces is obtained if all of the light rays impinging on the surface are so directed that their specularly reflected components are brought to a focus in the pupil of the eye. If a point light source is employed, it is necessary to locate the eye quite precisely at a viewing station, and since this imposes a hardship on the inspector, it is more desirable if the light source is somewhat extended, or is even large enough to encompass both eyes for binocular vision, because even if so enlarged it retains sufficiently critical illumination. By way of example, entirely satisfactory results may be obtained by using, in place of a point light source, a diffusing window of say 2" x 6", backed up by a lamp of from 10 to 20 watts. A filter of the desired color for the material being inspected is preferably employed. It is not necessary for the light source and eyes to be in the same vertical plane. Within narrow limits conjugate foci may be utilized to allow small backward and forward displacements of the source and viewing station. If large displacements are desired, a reflecting mirror may have an elliptical figure, whereas ordinarily a section of a spherical or cylindrical mirror has been found quite useful. I have found that with the inspection apparatus which will be described that a very small amount of the energy usually required can be employed; even as little as 1/50 of the energy heretofore required can produce entirely satisfactory illuminating characteristics. Thus, I have been able to greatly reduce the possibility of fogging the light-sensitive emulsions during the inspection operation.

Figure 2:
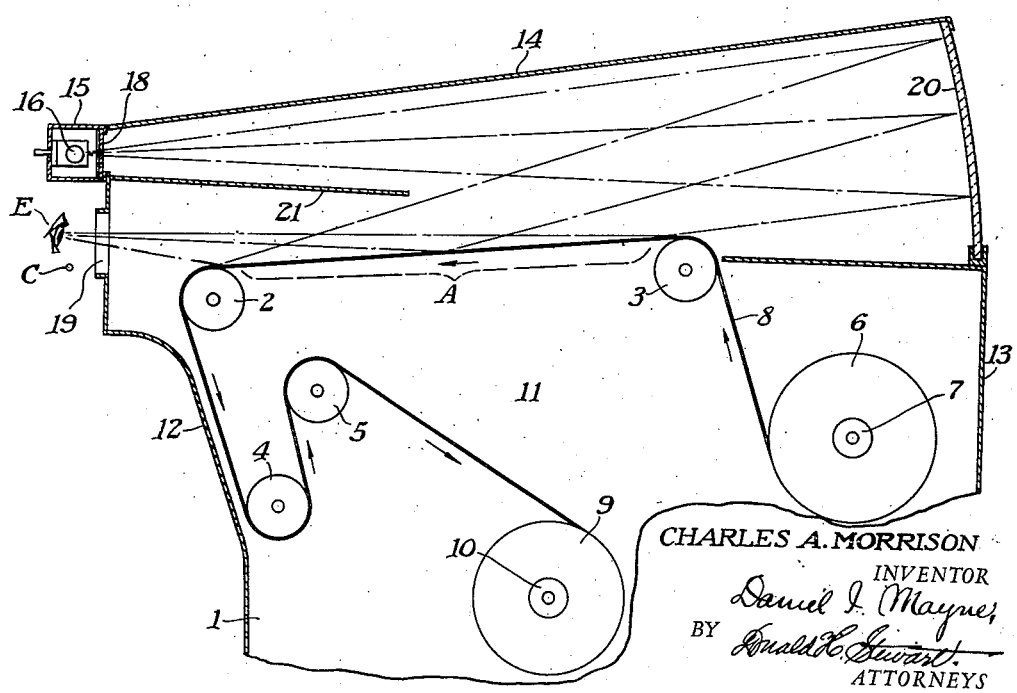

Coming now to the drawings in which like reference characters denote like parts throughout:

Fig. 1 is a somewhat schematic top plan view of an apparatus for illuminating light-sensitive materials for inspection constructed in accordance with and embodying a preferred form of my invention; and Fig. 2 is a section taken on line 2—2 of Fig. 1.

My invention consists in utilizing a point or small light source located adjacent a viewing station and above a viewing station on one side of an area of material to be inspected and placing a concave mirror on the opposite side so that only light rays reflected by the mirror may be brought into grazing incidence with the area to be inspected and thus be reflected from the material to a viewing station.

Referring to Fig. 1, a preferred embodiment of my invention may consist of a main support 1 which may carry a series of guide rollers 2, 3, 4 and 5, over which material to be inspected may be moved. As indicated in Fig. 2, a roll of such material 6 may be mounted on a hub 7, and this roll of material may be film, or paper, having a light-sensitive coating 8 on one side. This material may be moved over the guide rollers 3, 2, 4 and 5 and into a take-up coil 9 carried by a hub 10. The material may be driven constantly or intermittently in the direction shown by the arrow during the inspection operation and any suitable known means of marking the sheet for imperfections may be employed.

The frame may be enclosed by any suitable cabinet having side walls 11, a front wall 12, and a rear wall 13, and there may also be a top wall 14 and, if desired, a bottom wall, not shown in the drawings.

A light source 15 may be mounted on the cabinet to one side of the area indicated as A in Fig. 1 of the material to be inspected; this light source comprising a box-like housing preferably enclosing a pair of lamps 16 of low wattage. There is a window 17 in the front of the housing which may include a diffusing layer and a filter 18, if desired.

Adjacent the housing 15, but below it, is a viewing station 19 which is preferably in the form of an open frame or window, so that the eye E or eyes of an operator may view the area A of the sensitized material. The light source and the viewing opening are arranged preferably in the vertical relationship shown on one side of the material to be inspected, and on the opposite side I provide a concave reflector 20. This concave reflector may be of glass silvered, of polished metal, or any other suitable reflector, and I generally prefer to use a concave reflector which may be a section of spherical shape or elliptical shape. A cylindrical mirror with a vertical axis may be used with a source of light extended parallel to the axis of the mirror, but this is not a preferred construction.

Inside of the casing and extending between the side walls 11, I prefer to provide a light shield 21 which is positioned in such a manner, as shown in Fig. 2, as to prevent direct light rays from the light source 15 from reaching the area A to be inspected, and to prevent the direct rays from the light source from reaching the eye E of an operator. As will be seen from Fig. 2, all of the light rays passing above the shield 21 pass from the light source to the concave reflector 20, from which they are directed with more or less grazing incidence upon the area A of the material to be inspected, and by the material they are again reflected to the viewing station 19. The center of curvature of the spherical mirror section may lie at C.

Even with comparatively low wattage lamps, such as 5 or 10 watts, the area of the material being inspected appears to be brilliantly illuminated. The ratio of specular to diffused light received by the eye of an inspector is sufficiently high, so that the illumination on the surface appears very specular, even if the emulsion coating is actually a matte surface. Any imperfections on the surface being inspected appear in relatively high contrast to the generally specular appearance of the surface, and defects may be very readily viewed by an inspector.

The source of illumination 15 and the viewing station 19 are conjugates, so that the total light from the light source, except for slight losses, is directed across the material being inspected and reaches the viewing station. As above pointed out, I prefer a generally rectangular light source, since this permits some movement of the eyes of the inspector, and since, with the proper-sized light source, binocular vision can be used to advantage. Somewhat greater illumination with the same wattage source can be obtained with a point light source (or as near a point as is commercially obtainable), but this is generally not desirable because it requires the eye of an observer to be too accurately located at the conjugate foci of said point light source.

I have found that with my improved apparatus that a very small portion of the energy usually necessary to make imperfections visible can be used and, in addition, that there is far less eyestrain on the part of the inspector because of the fact that the surface being inspected appears very specular and defects show up in good contrast and can readily be picked up even with the sheet or roll of material 8 moving at a fairly rapid rate. Any desired means of marking the defect can be employed, but since this forms no part of the present invention it has not been shown in the present application.

I claim:

1. Apparatus for illuminating photographic light-sensitive materials for inspection for imperfections and utilizing a minimum amount of light comprising a support, means carried by the support for holding an area of film to be examined for imperfections and substantially in a plane, a source of light of limited area to one side of and above the area of the material to be examined, a shield between said source and said area to prevent direct illumination thereof, a viewing station adjacent the light source, a concave reflector on the opposite side of the area to be examined, the width of the reflector being greater than the area to be examined, and the radius of curvature of the mirror being substantially equal to the average distance of the light source and of the viewing station from the mirror such that the light rays reflected from the mirror are directed to the area to be examined at substantial grazing incidence, and rays then specularly reflected from the area to be examined are focused at the viewing station and rays reflected by imperfections in the area to be examined are deviated to one side of the viewing station whereby the surface to be inspected appears to have a specular surface brilliantly illuminated and the imperfections appear in exaggerated contrast.

2. Apparatus for illuminating photographic light-sensitive materials for inspection for imperfections and utilizing a minimum amount of light comprising a support, means carried by the support for holding an area of film to be examined for imperfections and substantially in a plane, a source of light of limited area to one side of and above the area of the material to be examined, a shield between said source and said area to prevent direct illumination thereof, a viewing station adjacent the light source, a concave spherical reflector on the opposite side of the area to be examined, the width of the reflector being greater than the area to be examined, and the center of curvature of the mirror being substantially at the same distance from the mirror as the light source and the viewing station such that the light rays reflected from the mirror are directed to the area to be examined at substantial grazing incidence, and rays then specularly reflected from the area to be examined are focused at the viewing station and rays reflected by imperfections in the area to be examined are deviated to one side of the viewing station whereby the surface to be inspected appears to have a specular surface brilliantly illuminated and the imperfections appear in exaggerated contrast.

3. Apparatus defined in claim 2 characterized by the light source comprising a rectangular area and a viewing station where the light rays from the light source are focused being of substantially the same area as that of the light source, both areas being of a size somewhat greater in width than the normal eye separation whereby the area to be examined may be viewed by both eyes of an operator.

CHARLES A. MORRISON.

REFERENCES CITED

The following references are of record in the file of this patent:

UNITED STATES PATENTS

| Number | Name | Date |
|---|---|---|
| 835,431 | Hughes | Nov. 6, 1906 |
| 1,195,912 | Cummings et al. | Aug. 22, 1916 |
| 1,846,533 | Thompson | Feb. 23, 1932 |
| 1,940,882 | Rich | Dec. 26, 1933 |
| 2,051,946 | Hewlett | Aug. 25, 1936 |
| 2,113,397 | Croft | Apr. 5, 1938 |
| 2,174,848 | Stahmer | Oct. 3, 1939 |
| 2,217,991 | Peck et al. | Oct. 15, 1940 |
| 2,246,501 | Bradner et al. | June 24, 1941 |
| 2,349,999 | Urbach | May 30, 1944 |

FOREIGN PATENTS

| Number | Country | Date |
|---|---|---|
| 530,724 | Great Britain | Dec. 18, 1940 |